United States Patent [19]

Affa et al.

[11] Patent Number: 4,615,359

[45] Date of Patent: Oct. 7, 1986

[54] SHROUD FOR AIRCRAFT DUCT

[76] Inventors: Stephen N. Affa, Pocatello Koa, Pocatello Creek Rd., Pocatello, Id. 83201; Robert S. Allison, 8878 Callita St., San Gabriel, Calif. 91775; Ira R. Newman, 6312 Variel St., Woodland Hills, Calif. 91367

[21] Appl. No.: 500,073

[22] Filed: Jun. 1, 1983

Related U.S. Application Data

[63] Continuation-in-part of Ser. No. 412,515, Aug. 30, 1982, abandoned.

[51] Int. Cl.⁴ .................................................. F16L 9/18
[52] U.S. Cl. ...................................... 138/104; 138/113; 138/114; 138/148; 165/11.1
[58] Field of Search ............... 138/104, 111, 113, 114, 138/148, 109; 165/11 R, 70; 181/207; 285/133 R, 45

[56]  References Cited

U.S. PATENT DOCUMENTS

| | | | |
|---|---|---|---|
| 488,248 | 12/1892 | Norris | 138/148 X |
| 2,076,216 | 4/1937 | Stadtfeld | 138/113 |
| 2,335,591 | 11/1943 | Hansell | 285/133 R X |
| 2,545,030 | 3/1951 | Isenberg et al. | 138/109 X |
| 2,894,537 | 7/1959 | Carr | 138/114 X |
| 3,088,294 | 5/1963 | Smith | 138/114 X |
| 3,471,177 | 10/1969 | Garrett et al. | 138/114 X |
| 3,830,290 | 8/1974 | Thamasett et al. | 138/104 X |
| 3,907,336 | 9/1975 | Siegmund | 138/104 X |
| 3,911,961 | 10/1975 | Peyton et al. | 138/113 |
| 3,918,530 | 11/1975 | Nyholm | 181/207 X |
| 4,033,381 | 7/1977 | Newman et al. | 138/113 X |
| 4,303,105 | 12/1981 | Rohner | 138/113 X |

*Primary Examiner*—James E. Bryant, III

[57]  ABSTRACT

The shroud is formed from sheet material and is cylindrical in shape. A plurality of spacers are associated with the sheet material. These spacers are designed to engage the outer surface of a duct to hold the cylindrical sheet material in radially outwardly spaced relationship to the duct, defining thereby an insulating air gap between the outer surface of the duct and the shroud. The angular space between the spacers serves as gas channels to permit gas to flow between the shroud and the outer surface of the duct, along the length of the duct. The shroud has a straight axially extending slot along its entire length for easy removal from a duct. An axially extending edge receiving pocket is formed on the shroud adjacent the slot for receiving the adjacent longitudinally extending edge of the slot to hold the shroud in a cylinrical shape and to provide a gas-tight closure for the slot.

7 Claims, 9 Drawing Figures

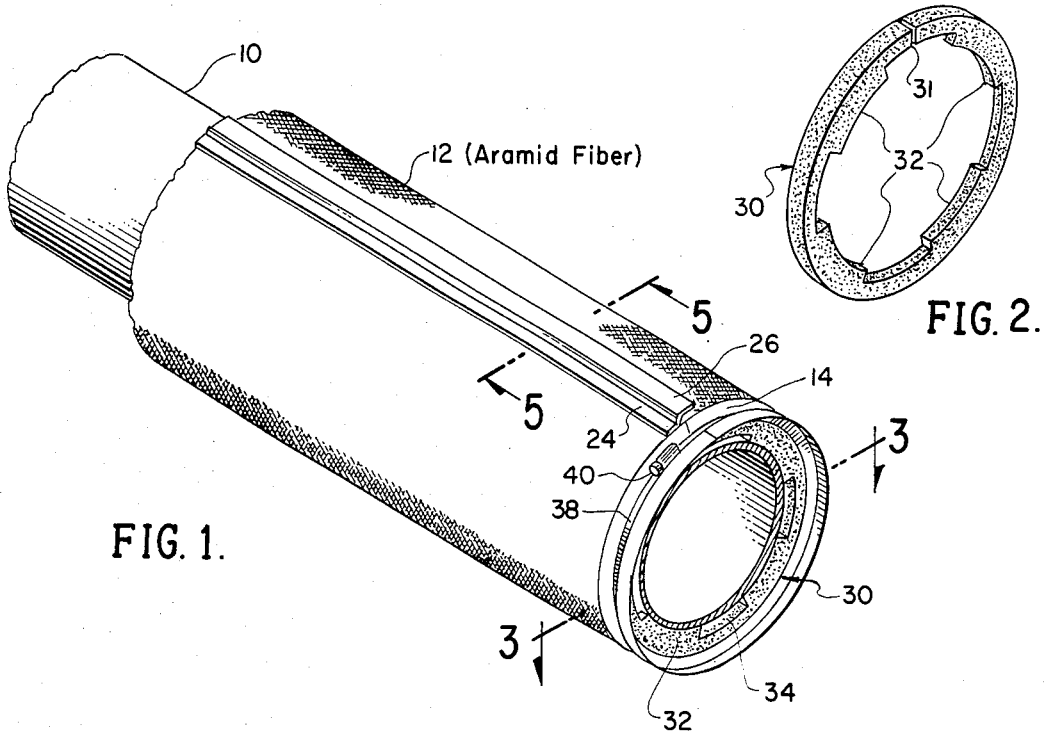
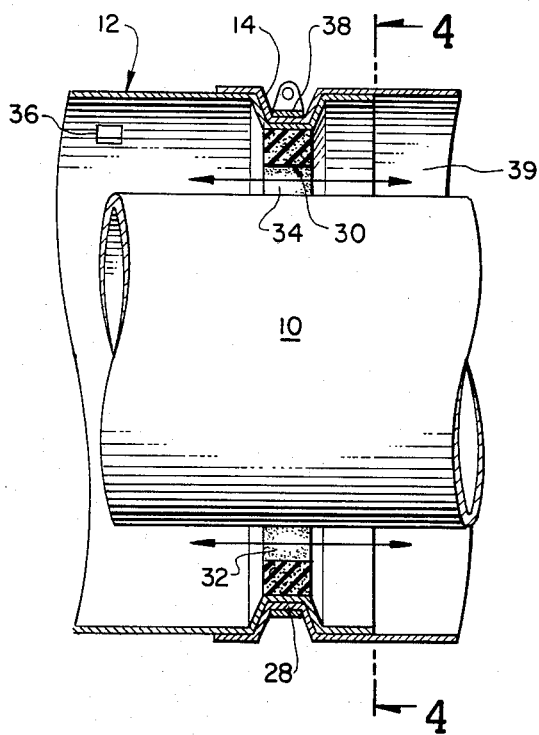
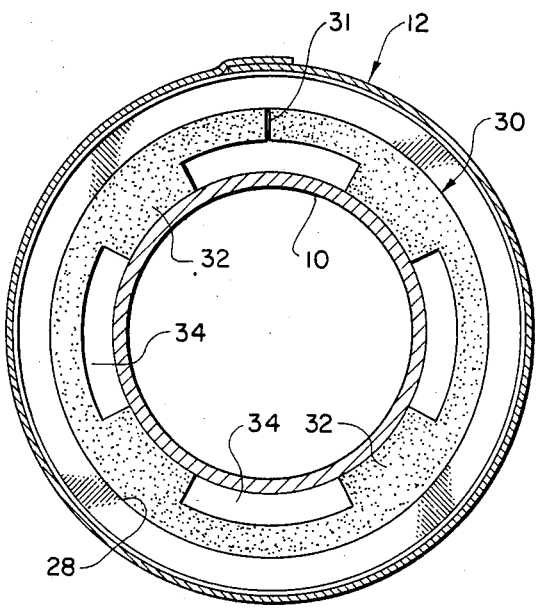
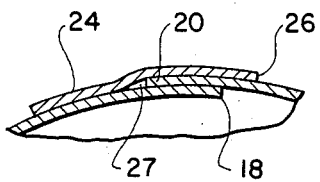
FIG. 1.
FIG. 2.
FIG. 3.
FIG. 4.
FIG. 5.

FIRE RESISTANT ALUMINUM MATERIAL WAFFLE PATTERN

SHROUD FOR AIRCRAFT DUCT

This is a continuation-in-part of patent application No. 412515, filed Aug. 30, 1982, now abandoned.

STATEMENT OF PROBLEM

Ducts installed in modern aircraft are formed from titanium because it is strong and light. However, titanium is very expensive and, in addition, it can be attacked and corroded by exposure to the hydraulic fluids used in aircraft. Since aircraft have very many hydraulic ducts, leakage in these ducts, which is almost always present, permits drops of the hydraulic fluid to fall on and corrode away the aircraft ducts, causing leakage in the ducts and danger to the aircraft. Consequently, the ducts have to be examined very frequently to make certain they are in a safe condition. This increases aircraft downtime.

The ducts are generally covered by titanium shrouds for protection against corrosion. These shrouds are themselves subject to attack by these hydraulic fluids and, in addition, they are costly and increase the weight of the aircraft. They do protect the ducts and increase their useful worklife somewhat. However, when the shrouds become too corroded to protect the ducts, they have to be removed. This involves removing the ducts as well, because the attachment of the titanium shrouds to the titanium ducts is too difficult to be done in the field, so that the ducts and the shrouds have to be sent to the manufacturers to be refinished.

This is costly because it is necessary to keep a large supply of spare ducts in stock to prevent the aircraft from being immobilized for long periods of time while the ducts and shrouds are being repaired. Another disadvantage in the use of the titanium ducts and shrouds is that aircraft vibration causes the shrouds to vibrate with the ducts producing metal fatigue. This is another cause of duct and shroud failure.

In addition, the titanium shroud gets just as hot as the duct it covers. This requires additional insulation, to protect heat-sensitive aircraft components from the heat of the shrouds. This extra insulation increases the weight the aircraft must carry, and in modern high-speed aircraft any increase in weight produces a much larger decrease in the aircraft range or carrying capacity.

PRIOR ART

Heretofore, as exemplified by U.S. Patent to Peyton U.S. Pat. No. 3,911,961, ducts for aircraft were surrounded by light weight shrouds formed from metal foil reinforced by a thin ply of resin impregnated fabric. The air gap between the duct and the surrounding shroud served as a heat insulator. However, this patent was not concerned with the problem that this invention is concerned with; namely providing a shroud which is impervious to the hydraulic fluids used in aircraft, and which is insulated from the heat and vibration from the titanium duct, and which is provided with an air or gas channel extending along the entire length of the duct.

In this patent, as seen in FIG. 4, the molded semicircular fiberglass rings spaced along the duct prevent the passage of gas along the length of the duct, and in addition they do not adequately insulate the shroud from heat and aircraft vibration. Consequently shroud 11 is subjected to destructive aircraft vibration.

The patent to Hallwood U.S. Pat. No. 3,628,814 deals with temporary joints for steam pipes, and so is not concerned with the problem this invention deals with. In particular Hallwood discloses an outer duct or shroud 30 formed from polyethylene or polyvinal chlorides that cover the conduit ends. Hallwood does not disclose any means for isolating shroud 30 from heat or vibration, which this invention is concerned with.

The patent to Isenberg U.S. Pat. No. 2,545,030 discloses a conveyor pipe 11 surrounded by a shroud formed from plies of asbestos, felt, paper, and canvas. Isenberg does not disclose any means for isolating the outer shroud 30 from vibration and does not provide a gas passage intermediate to the conveyor pipe and the shroud, which extends along the entire length of the pipe.

The patent to Norris U.S. Pat. No. 488,248, discloses a steam pipe surrounded by a shroud formed from a layer of asbestos. But Norris does not disclose an air channel between the steam pipe and shroud extending along the length of the shroud and he does not procted the shroud from heat and vibration from the steam pipe.

It is apparent that it would be very advantageous if the titanium duct could be wrapped in an easily-removable shroud which is light, strong and impervious to the hydraulic fluids used in aircraft and which is inexpensive to manufacture, and which is a poor conductor of heat. An important object of this invention, therefore, is to provide such a shroud.

This and other objects of this invention will become more apparent and better understood in light of the accompanying specification and drawings herein.

FIG. 1 is a perspective view of a titanium duct with a shroud covering the duct constructed according to the principles of this invention.

FIG. 2 is a perspective view of a spacer member which is to be mounted on the inner surface of a shroud.

FIG. 3 is an elevational sectional view of the junction of two shrouds taken on the line 3—3 of FIG. 1 and disclosing the gas passages formed in the spacer members connecting both shrouds.

FIG. 4 is a sectional view taken on line 4—4 of FIG. 3.

FIG. 5 is a sectional view of a portion of the periphery of the shroud disclosing the edge receiving pocket which prevents gas from passing through the slot in the duct and which makes certain the assembled shroud has a uniform diameter along its entire length.

Figure 6:
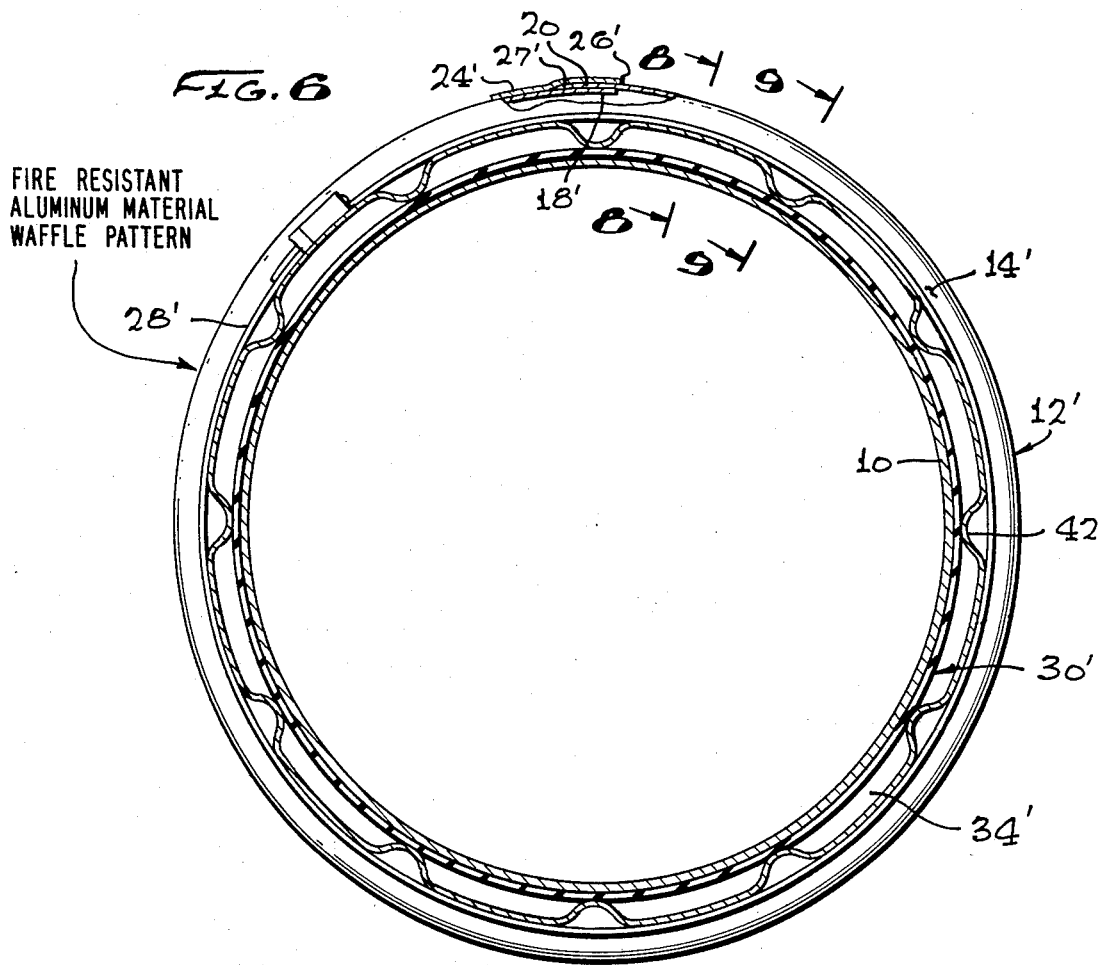
FIG. 6 is a cross-sectional view of a modified shroud covering a titanium duct constructed according to the principles of this invention.

Referring now to FIG. 1 of the drawing, a titanium duct (10) is surrounded by a generally cylindrical shroud (12). The shroud is formed from a sheet material such as an organic aramid fiber which does not react with the hydraulic fluids used in aircraft. Aramid fibers come in a number of forms, but the one most suitable for use in shrouds has a braking tenacity of 11 g/den, tensile strength at 1,000 psi of 410, and a braking elongation percent of 3.6. One of the aramid fibers which has these characteristics is known in the trade as Kevlar.

This aramid fiber is available in cloth, but to prevent the Skydral from penetrating the cloth through the weaves in the cloth, the cloth is immersed in phenolic to close up the holes in the weave and thereby make the cloth impervious to Skydral. Then the cloth is wrapped around a mandrel and baked to form it into a desired shape, usually cylindrical, althought it is understood that the shroud can have other tube-like shapes in accourdance with the functions required.

The inner surface of the cylindrical shroud may be coated or sprayed with aluminum paint or cement to reflect heat coming from the duct so the shroud will have a lower temperature and to make the shroud fluid resistant. In addition, the cylindrical shroud may be coated with a suitable fire retardant cement. If desired, the surface of the sheet material forming the shroud may be provided with a rigidizing waffle pattern for strenth.

The cylinder is formed with a straight slot extending along its entire length defining slot edges (18) and (20), see FIG. 5. Since the formed cylindrical shroud is somewhat resilient the adjacent edges of the slot can be pulled apart far enough so the shroud can be easily installed or removed from the duct. An axially extending edge receiving pocket (27) is formed on the shroud adjacent to the slot for receiving the slot edge (20) to hold the sheet material in a cylindrical shape and to provide a gas-tight closure for the slot (see FIG. 5).

The pocket is formed by mounting flange (24) secured by a suitable means to the surface of the elastomeric material adjacent to the slot. A radially outwardly projecting pocket flange (26) is secured to the mounting flange (24) for receiving the opposite edge of the shroud at the slot. In assembled relationship, edge (20) of the shroud is inserted in the interior (27) of the pocket to provide a gas-tight closure for the slot. In addition, this arrangement maintains the diameter of the shroud uniform.

The shroud is provided with a plurality of radially inwardly extending clamping band receiving grooves (14) situated transverse to the axial length of the shroud for receiving a clamping band, see FIGS. 1 and 3. The clamping bands (38) are designed to be mounted on the outer surface of the base (28) of the grooves 14. The inner surface of base (28) of grooves (14) serves as a support structure to hold generally-cylindrical spacer rings or members (30). The spacer rings are provided with identical uniformly angularly-spaced inwardly projecting abutments (32) for engaging the outer surface of the duct (10) so that the shroud is held in uniformly radially outwardly spaced relationship to the duct, defining thereby an insulating air gap around the duct, see FIG. 4.

The abutments (32) are preferably formed from silicone impregnated rubber. The use of silicone impregnated rubber for the spacer members or at least the abutments is important, because this material is a poor transmitter of heat and consequently prevents heat from the duct from reaching the shroud (12) through the abutments (32). In addition, the resilience of the abutment isolates the shroud from direct duct vibration so the shroud is not subject to destructive vibration. Consequently, in use, the surface of the shroud is comparatively cool and vibration free. This eliminates the necessity of extra insulation that might be required when the shroud covering a duct is mounted near heat-sensitive components in the aircraft.

These features give the spacer rings the combined function, among other things, of isolating the shroud from the vibration and heat in the duct. The spacer rings are glued on or otherwise suitably attached to the inner surface to the base (28) of the grooves (14) (see FIGS. 3 and 4). In this way when the clamping band (38) is mounted in a groove (14) and tightened, the shroud is clamped to the duct (10) mounted inside the shroud, see FIGS. 3 and 4.

In addition, as seen in FIG. 2, the spacer rings (30) are slotted at (31). The spacer rings are mounted on the shroud (12) with the slots (31) aligned with the slot in the cylindrical shroud. In this way, when the edges of the slot in the shroud are pulled apart, the edges of slot (31) of the speacer rings also pull away from each other so that the shroud can be easily removed from or mounted on a duct.

The abutments (32) on the spacer members are disposed in uniformly angularly speaced relationship to each other. The angular spaces (34) between the abutments (32) function as channels to permit gas to flow through the spacer rings or members (30) between the shroud and the outer surface of the duct along the entire length of the duct.

The channels are important because it is necessary to insert duct leak detectors (36) along the length of the shroud, (see FIG. 3.) These leak detectors are generally thermal in function and can detect an increase in temperature caused when a leak in the duct allows hot gases to enter the insulating air gap between the duct and the shroud. When these hot gases encounter the detector (36) they cause a warning signal to operate, notifying the crew about the leak.

As shown in FIG. 3, if a leak in the duct occurred to the right of the junction between the two shrouds, the hot escaping gases could not reach the detector (36) without the communication provided by channels (34) extending through the spacer ring (30).

In order to hold a shroud on the duct, a generally conventional adjustable cylindrical clamping band (38) is mounted in the groove (14). The screw adjustment (40) on the clamping band permits the clamp to be squeezed down on the shroud thereby forcing the abutments (32) against the periphery of the duct (see FIGS. 2, 3 and 4). This holds the shroud in place on the duct.

Figure 7:
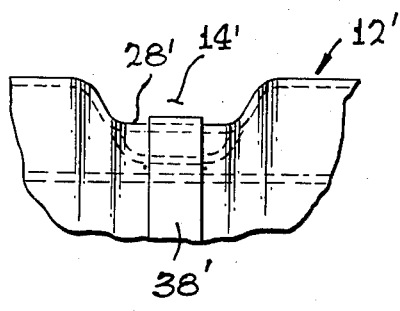
FIG. 7 is an elevational view of a portion of the modified shroud shown in FIG. 6, disclosing a clamping strap mounted in the clamping strap receiving groove for holding the shroud onto the duct.

The modified cylindrical shroud shown in FIG. 6 is formed from a suitable aramid fiber such as Kevlar and functions like the shroud shown in FIG. 1. The surface of this shroud is provided with axially spaced clamping band receiving grooves 14' situated transverse to the axis of the shroud, see FIG. 7. The radially inwardly spaced base 28' of each groove 14 is provided with a plurality of radially inwardly projecting uniformly angularly spaced arcuate spacer members 42, see FIG. 6. These spacer members are adapted to engage the surface of the duct, or as will be described below, the rubber-like rings or bands 30' surrounding the duct to hold the shroud 12' in radially outwardly spaced relation to the duct. This defines an insulating air gap 34' around the duct between the shroud and the surface of the duct.

In this embodiment, rings or bands 30' preferably formed from a silicone impregnated rubber are secured by any suitable means to the outer surface of the ducts. These bands are positioned beneath the base 28' of the clamping band receiving grooves 14', see FIGS. 8 and 9.

As shown, the arcuate spacer members 42 engage the rings or bands 30'. Since the material forming these bands is a poor conductor of heat and is formed from a resilient rubber-like material, this arrangement effectively isolates the shroud from aircraft-induced vibration and heat in the ducts. In this way the life of the shrouds is prolonged.

Figure 8:
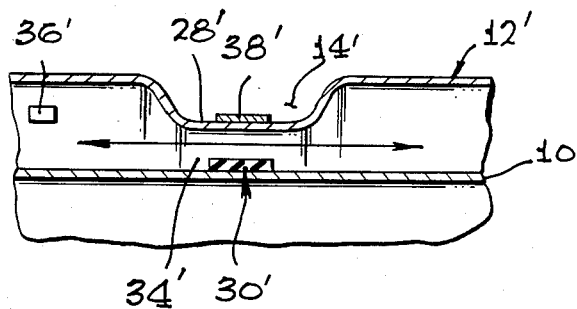
FIG. 8 is a sectional view taken on line 8—8 of FIG. 6.
Figure 9:
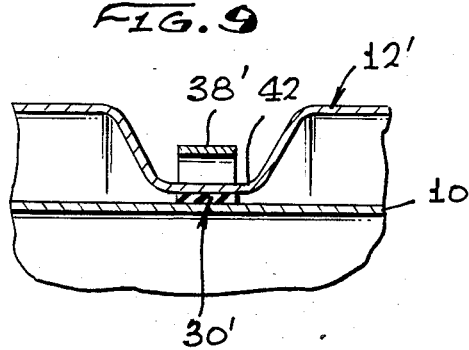
FIG. 9 is a sectional view taken on line 9—9 of FIG. 6.

As seen in FIGS. 6 and 8, the arcuate angularly spaced portions of the base 28' of the grooves 14' between the spacers 42 define uniformly angularly spaced channels 34' beneath the band receiving grooves 14'. Consequently, if a duct leaks gas escaping from the duct flows between the outer surface of the duct 10 and the inner surface of the shroud along the entire length of the duct and eventually to a leak detector. Consequently, as in the embodiment shown in FIG. 4, hot gasses flowing from a leak in the duct would be detected.

The clamping band 38' embracing the base 28' of the grooves 14' forces the arcuate spacer member 42 against the resilient bands 30 to hold the shroud in place on the duct as described above.

Having shown and described the invention, what I claim as new is:

1. An apparatus comprising a duct for use in aircraft, a shroud mounted on said duct, said shroud comprising an axially extending tube, the surface of said tube having at least one clamping band receiving groove formed therein, said groove having a radially inwardly spaced base, said base having a plurality of radially inwardly projecting angularly spaced arcuate projections defining spacers, a band formed from a heat resistant rubber-like material secured to the outer surface of the duct beneath said clamping band receiving groove, said spacers engaging the outer surface of said band for holding said shroud in a radially outwardly spaced relationship to said duct, defining thereby an insulating air gap between the duct and the shroud and isolating said shroud from aircraft vibration and heat in the duct, the portions of the base of the groove between said arcuate projections defining channels beneath said clamping band receiving groove for the passage of gases in the air gap between the outer surface of the duct and the inner surface of the shroud.

2. The apparatus described in claim 1 including a plurality of heat detectors mounted in fixed relationship to said shroud along the length of said linearally extending air gap and communicating therewith whereby hot gas leaks in said duct can be detected.

3. The apparatus described in claim 1 wherein said resilient tube is slit along its entire length whereby the adjacent edges of the resilient tube by the slit and be pulled apart so the tube can be mounted on a duct.

4. The apparatus described in claim 3 wherein the shroud includes a longitudinally extending mounting flange mounted on said shroud along the edge of said slit, a pocket flange attached to said mounting flange, said pocket flange in radially outwardly spaced relation to the mounting flange and extending adjacent the edge of said slit defining thereby an edge receiving pocket, edge of said slit positioned in said pocket to provide a gas-tight closure for the slit in said shroud.

5. The apparatus described in claim 4 wherein the inner surface of the shroud is coated with a fire resistant aluminum material to reduce the temperature of the shroud and wherein the surface of the shroud is provided with a rigidizing waffle pattern formed therein for strength.

6. An apparatus comprising a duct for use in aircraft, a shroud mounted on said duct, said shroud comprising a generally cylindrical resilient tube formed from an organic aramid fiber, said tube being slit along its entire length whereby adjacent edges of the slit can be pulled apart so the tube can be mounted on a duct, at least one radially inwardly extending clamping band receiving groove situated transverse to the axis of a tube, said groove including a base which is radially inwardly spaced from the circumferential periphery of said tube, said base adapted to receive a clamping band whereby the tube can be clamped to a duct, said base of said groove having a plurality of radially inwardly projecting angularly spaced arcuate projections defining spacers, a band formed from a heat resistant rubber-like material secured to the outer surface of the duct beneath said clamping band receiving groove, said spacers engaging the outer surface of said band for holding said shroud in a radially outwardly spaced relationship to said duct defining thereby an insulating air gap between the duct and the shroud and isolating said shroud from aircraft vibration and heat in the duct, the portions of the base of the groove between said arcuate projections defining channels beneath said clamping band receiving groove for the passage of gases in the air gap between the outer surface of the duct and the inner surface of said shroud, and a plurality of heat detectors in fixed relationship to said shroud mounted along the length of said air gap and communicating therewith whereby hot gas leaks in the duct can be detected.

7. The apparatus described in claim 6 wherein the inner surface of the shroud is coated with a fire resistant aluminum material to reduce the temperature of the shroud, and wherein the surface of the shroud is formed with a rigidizing waffle pattern for strength.

* * * * *